(12) United States Patent
Shimada et al.

(10) Patent No.: US 10,974,275 B2
(45) Date of Patent: Apr. 13, 2021

(54) DECORATED PARTS HAVING A DECORATIVE SURFACE WITH A DESIGN DRAWN THEREON

(71) Applicant: TRINITY INDUSTRIAL CORPORATION, Aichi (JP)

(72) Inventors: Tokinobu Shimada, Aichi (JP); Yukihiro Goto, Aichi (JP)

(73) Assignee: TRINITY INDUSTRIAL CORPORATION, Aichi (JP)

( * ) Notice: Subject to any disclaimer, the term of this patent is extended or adjusted under 35 U.S.C. 154(b) by 319 days.

(21) Appl. No.: 15/562,952

(22) PCT Filed: Mar. 22, 2016

(86) PCT No.: PCT/JP2016/058894
§ 371 (c)(1),
(2) Date: Sep. 29, 2017

(87) PCT Pub. No.: WO2016/158544
PCT Pub. Date: Oct. 6, 2016

(65) Prior Publication Data
US 2018/0111227 A1 Apr. 26, 2018

(30) Foreign Application Priority Data
Mar. 31, 2015 (JP) .............................. JP2015-072983

(51) Int. Cl.
*B44C 1/22* (2006.01)
*B05D 3/06* (2006.01)
(Continued)

(52) U.S. Cl.
CPC .......... *B05D 3/063* (2013.01); *B23K 26/0006* (2013.01); *B23K 26/043* (2013.01);
(Continued)

(58) Field of Classification Search
CPC .......... B60R 13/02; B44F 1/02; B44C 1/228; B41M 5/24; B23K 26/402
See application file for complete search history.

(56) References Cited

U.S. PATENT DOCUMENTS 2,572,275 A * 10/1951 Millmather, Jr. ....... B44C 1/222
451/57
5,736,090 A * 4/1998 Yamamoto .......... B29C 37/0028
264/255
(Continued)

FOREIGN PATENT DOCUMENTS

JP 2008-215020 9/2008
JP 2012-176744 9/2012
(Continued)

*Primary Examiner* — Timothy Kennedy
*Assistant Examiner* — Alexander A Wang
(74) *Attorney, Agent, or Firm* — Clark & Brody LP (57) ABSTRACT

This invention provides a method for manufacturing a decorated part having a dynamic visual effect of a design that is drawn onto the surface of a work, thus reducing the manufacturing cost. The decorated part is manufactured by a laser-irradiating process, which involves irradiating a laser onto a decorative surface 4, thus forming a design 20 having many laser-processed linear grooves 21 closely aligned in a specific direction F1 on said decorative surface. Also, in the laser-irradiating process, said design 20 is formed such that the angle θ2 that is made by the specific direction F1 and by the direction F2 in which the laser-processed linear grooves 21 are extending is gradually changing into the direction in which such laser-processed linear grooves are aligned.

2 Claims, 6 Drawing Sheets

(51) Int. Cl.

| | | |
|---|---|---|
| *B60R 13/02* | (2006.01) | |
| *B23K 26/359* | (2014.01) | |
| *B41M 5/24* | (2006.01) | |
| *B44F 1/02* | (2006.01) | |
| *C08J 7/12* | (2006.01) | |
| *B23K 26/08* | (2014.01) | |
| *B23K 26/04* | (2014.01) | |
| *B23K 26/082* | (2014.01) | |
| *B23K 26/364* | (2014.01) | |
| *B23K 26/402* | (2014.01) | |
| *B23K 26/00* | (2014.01) | |
| *C08J 7/04* | (2020.01) | |
| *B23K 103/00* | (2006.01) | |
| *B23K 101/00* | (2006.01) | |
| *B23K 103/16* | (2006.01) | |
| *B23K 101/34* | (2006.01) | |

(52) U.S. Cl.
CPC ........ *B23K 26/082* (2015.10); *B23K 26/0861* (2013.01); *B23K 26/359* (2015.10); *B23K 26/364* (2015.10); *B23K 26/402* (2013.01); *B41M 5/24* (2013.01); *B44C 1/228* (2013.01); *B44F 1/02* (2013.01); *B60R 13/02* (2013.01); *C08J 7/0427* (2020.01); *C08J 7/123* (2013.01); *B23K 2101/006* (2018.08); *B23K 2101/34* (2018.08); *B23K 2103/172* (2018.08); *B23K 2103/42* (2018.08)

(56) References Cited

U.S. PATENT DOCUMENTS

| | | | | |
|---|---|---|---|---|
| 2005/0048263 | A1* | 3/2005 | Ford | B60J 10/273 |
| | | | | 428/143 |
| 2007/0104874 | A1* | 5/2007 | Ogawa | B05D 7/542 |
| | | | | 427/372.2 |
| 2015/0197665 | A1* | 7/2015 | Hsieh | C09D 175/00 |
| | | | | 427/458 |

FOREIGN PATENT DOCUMENTS

| | | |
|---|---|---|
| JP | 2013-237020 | 11/2013 |
| JP | 2015-066807 | 4/2015 |

* cited by examiner

DECORATED PARTS HAVING A DECORATIVE SURFACE WITH A DESIGN DRAWN THEREON

TECHNICAL FIELD

This invention relates to a method for manufacturing decorated parts, by which a design is made onto the surface of a three-dimensional work, and such invention relates to such decorated parts.

TECHNICAL BACKGROUND

To improve the design or quality of automobile interior-parts or the like, the decorated parts of an automobile (i.e. the console-box, the instrument-panel and the arm rest or the like), of which decorations are added onto the surface of a work, are widely used. As a decorative method for adding decoration to such decorated parts of an automobile, a method for attaching a decorative film, onto which a specific design (i.e. a wood-grain pattern, a geometric pattern or the like) has been printed, onto the surface of a work is conventionally suggested. As a less costly and easier decorative method, a method by which a design is laser drawn onto the surface of a work is conventionally suggested (see i.e. Patent Document 1). Laser drawing is a decorative method by which a laser is irradiated onto the surface of a part, and that the heat being emitted by such an irradiating laser changes the surface of that part to let a design be drawn thereon.

PRIOR ARTS

Patent Document

Patent Document 1: Japanese published unexamined application No. 2012-176744 (see FIGS. 1, 4 or the like)

DISCLOSURE OF THE INVENTION

Problems to be Solved by the Invention

In the case that a decorative film is attached to the surface of a work, the problem of high manufacturing cost arises due to the material cost in plate-making or the like in printing a design onto such decorative film, as well as the long time that it takes for such a plate-making process. Also, recently, it is required to improve the excellence of design of auto-motive-decorated parts by adding especially a dynamic design (i.e. a sparkling effect) among various visual effects (including a three-dimensional effect, a feeling-of-depth effect or a sparkling effect). However, in using such a plate-making process, it is impossible to make a delicate work of design, thus making it difficult to produce such dynamic visual effects. It is predictable to produce such dynamic visual effects in a design that is made by laser drawing. However, such a method is not conventionally available.

This invention was achieved in light of the foregoing problems in providing dynamic visual effects in a design drawn on the surface of a work, thus providing a method for manufacturing decorated parts and thus providing decorated parts, which method reduces the cost of manufacturing.

Means for Resolving the Problems

To resolve the aforementioned problems, the first aspect of this invention refers to a method for manufacturing decorated parts by forming a decorated part of which a design is drawn onto the surface of a three-dimensional work, characterized in comprising a laser-irradiating process for forming such a design having laser-processed linear grooves closely aligned in a specific direction by irradiating a laser onto the decorative surface, whereon the design is formed such that an angle that is made by the specific direction and by the direction of the extending laser-processed linear grooves is gradually changing into the direction in which such laser-processed linear grooves are aligned.

The first aspect of this invention describes the laser-irradiating process by which the (specific) direction in which the laser-processed linear grooves are aligned and the direction in which they are extending make an angle that gradually changes into the direction in which the laser-processed grooves are aligned, thus forming the design. Therefore, as the direction of one's eye changes, the eye catches the light that is being reflected by the different laser-processed linear grooves. Thus, such a design is made seemingly to be an active one such that a dynamic visual effect is achieved, which eliminates the need of the process whereby a decorative film is attached to the surface of the work, which reduces the material cost of such decorative film and of the plate-making or the like that is used in printing a design onto the decorative film, thus reducing escalating manufacturing cost.

The design is formed of a combination of blocks of which laser-processed linear grooves are aligned in parallel with each other. In the laser-irradiating process of making the specific blocks, such laser-processed linear grooves are formed sequentially by irradiating laser. Then, in series of the operation, repeatedly done, the laser-processed linear grooves comprising a different block adjoining the specific block are sequentially formed by such irradiating laser. While proceeding from the step of forming the specific block to the step of forming the different block in the above operational series, it is possible to change the angle that is made by the specific direction and by the direction in which the laser-processed linear grooves comprising the different block are extending by 15 degrees or less from the angle that is made by the specific direction and the direction in which the laser-processed linear grooves configuring the specific block are extending, thus making it possible to change the angle that is made by the (specific) direction in which the laser-processed linear grooves are aligned and the direction in which the laser-processed linear direction is extending by 15 degrees or less. Each time, the operation is shifting from the specific block to the different block. As a result, the block reflecting the light according to the direction of one's eye changes. Thus, such a design is made seemingly to be an active one such that a dynamic visual effect is achieved. Also, the image-data of the simply formed block in which the laser-processed linear grooves are aligned in parallel is combined to form the laser-irradiation data for the irradiating laser, thus making it easier to produce such laser-irradiation data. Hence, such a block is preferably a form of which there is no clearance between adjacent blocks, including e.g. a rectangular shaped block in planer view, a triangular shaped block in planer view or a hexagonal shaped block in planer view or the like. Also, in the case that the design is formed of a combination of blocks of which the laser-processed linear grooves are individually aligned in parallel, it is preferable to form such laser-processed grooves having equal pitch. As such, it is easy to view each laser-processed linear groove. Thus, the contrast of the whole design is not easily deteriorated. It is possible to form the design without using the above-mentioned block. In which case it is easier to make the density of the laser-processed linear grooves even, thus realizing a natural design of one not having joints.

The type of laser that can be used in the laser-irradiating process is not limited. It is possible to use e.g. a gas laser or a solid-state laser or the like. A gas laser can either be a $CO_2$ laser, a He—Ne laser, an Ar (argon) laser or an excimer laser or the like. On the other hand, a solid-state laser can either be a YAG (yttrium-aluminum garnet) laser, a $YVO_4$ (Yttrium Orthovanadate) laser, a ruby laser or a glass laser or the like.

It is preferable in the laser-irradiating process to form the laser-processed linear grooves with a linear pitch of 0.1 mm or more and 1.0 mm or less. If the linear pitch is less than 0.1 mm, it becomes difficult to view each laser-processed linear groove. Thus, the contrast of the whole design is deteriorated. On the other hand, if the linear pitch of a laser-processed linear groove is more than 1.0 mm, the elaborateness of the design achieved by such a laser-processed linear groove becomes poor. Thus, the excellence of the design of the decorated part is deteriorated. The term "linear pitch" as described in this invention means the measured value obtained by observing the decorative surface of the work by using a (VHF-200, Keyence Corporation) microscope.

It is possible before the laser-irradiating process to proceed to the thermoset coating layer forming process to form the thermoset coating layer consisting of coating material with a thermosetting property to cover the surface of the work. It is possible in such laser-irradiating process to irradiate the laser onto the surface of the thermoset coating layer to form the laser-processed linear grooves on the decorative surface, i.e. on the surface of the thermoset coating layer. As such, even if there is a defect such as a sink or a weld-line or the like on the surface of the work, such a defect can be covered with the thermoset coating layer, thus making it possible to prevent the excellence of the design of the decorated parts in production from deteriorating. Moreover, the formed thermoset-coating layer protects the surface of the work, thus improving the anti-scratch effect of the work.

Hence, the type of thermoset-coating layer formed in the thermoset-coating layer process is not particularly limited but includes e.g. a coating layer formed of a solid-coating material; a coating layer formed of a brilliant-agent-containing coating material; a clear and colorless coating layer that is formed of a clear-coating material (i.e. a coating material without a pigment), or the like.

It is possible, after the laser-irradiation process, to proceed to another process of forming a brilliant-agent-containing coating layer that forms a coating layer with a scale-like brilliant agent to cover the decorative surface. Such a brilliant-agent-containing coating layer makes it possible beautifully to change the degree of light being reflected or not being reflected from those sections of the decorative surface where the laser-processed linear grooves either exist or do not exist. Thus, such a coating layer makes it possible to express the change in color and the depth of feeling of the design, thus improving the excellence of such design. Furthermore, forming such a coating layer containing such a brilliant agent protects both the decorative surface and the surface of the laser-processed linear grooves, thus improving the anti-scratch effect of the work.

Such a brilliant agent should be made of inorganic materials such as minerals, metals, glass or the like, which means materials of high reflectivity and that specifically includes metal flakes, tetanized-mica pigment or glass beads or the like. Also, the brilliant-agent coating material should include a metallic-coating material (i.e. a coating material of which the metal flakes are contained in a translucent enamel such as a thermoset acryl-coating material), a pearl-coating material (i.e. a coating material of which tetanized-mica pigment or glass beads are contained in a translucent enamel) or the like.

The surface of the work can be made of a plurality of members. The outer periphery of the decorative surface can be located on the character line that is the connecting section of the plurality of members. As such, the level of gloss on the outer periphery, which is the character line of the decorated parts, changes. Thus, three-dimensional expressions can be done.

The second aspect of this invention refers to a decorated part with a decorative surface of which a design is drawn onto the surface of the three-dimensional work, characterized in that the design of laser-process linear grooves closely aligned in a specific direction is made on the decorative surface, and that the angle that is made by the specific direction and by the direction in which the laser-processed linear grooves are extending gradually changes into the direction in which the laser-processed linear grooves are aligned.

The second aspect of this invention allows the design to be formed such that the angle, made by the (specific) direction in which the laser-processed linear grooves are aligned and the direction in which they are extending, is gradually changing into the direction of the alignment of said laser-processed linear grooves. Therefore, as the direction of one's eye changes, the eye catches the light that is being reflected by the different laser-processed linear grooves. Thus, such a design is made seemingly to be an active one such that a dynamic visual effect is achieved, which eliminates the need of a process whereby a decorative film is attached to the surface of the work, which thus reduces the material cost of plate-making or the like in making such a decorative film, and which reduces the cost of printing such a design onto such a decorative film, thus reducing the escalating cost of manufacturing such a design. Also, in the case that the design is formed of a combination of blocks of which the laser-processed linear grooves are individually aligned in parallel, it is preferable to form such laser-processed grooves with equal pitch. As such, it is easy to view each laser-processed linear grooves. Thus, the contrast of the whole design is not easily deteriorated.

Effects of the Invention

As described above, the first to seventh aspects of this invention make it possible to provide such a design drawn upon the surface of the work with a dynamic visual effect, thus reducing the manufacturing cost.

MODES FOR CARRYING OUT THE INVENTION

First Embodiment

Hereinafter, the first embodiment of this invention is described in reference to the drawings.

Figure 1:
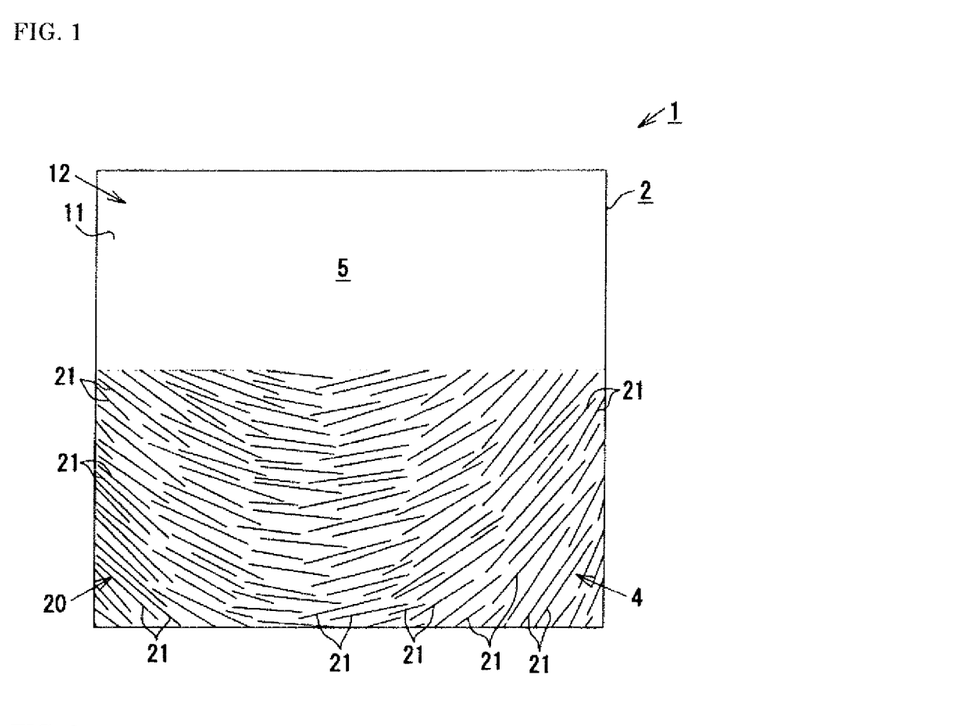
FIG. 1 is a schematic-planer view of some of the automotive decorated parts as the first embodiment.
Figure 2:
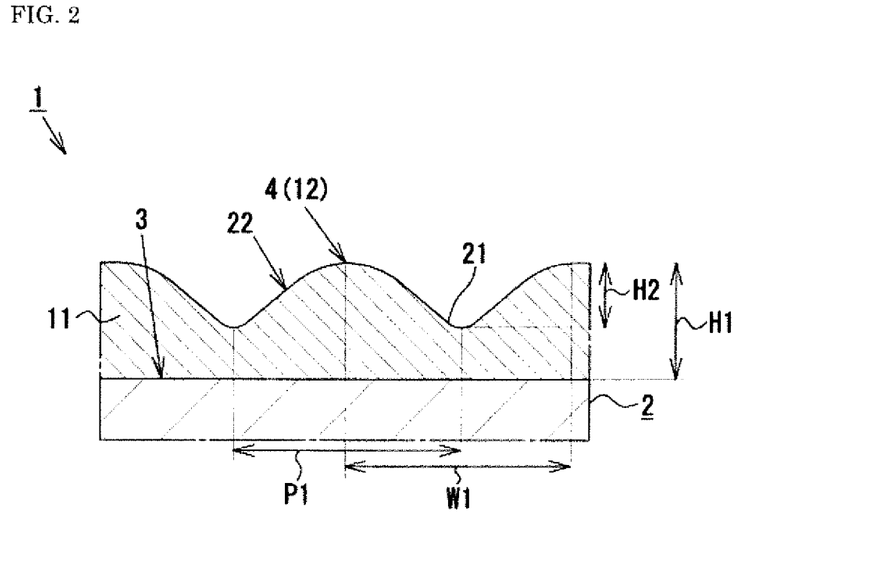
FIG. 2 is a cross-sectional view of the main section of the work and of the thermoset coating layer.

As shown in FIGS. 1 and 2, the automotive-decorated part 1 is formed of a black thermoset resin (e.g. an ABS resin for the embodiment of this invention), comprising a three-dimensional work 2. The automotive-decorated part 1 as the embodiment of this invention is a decorative panel that covers the upper surface of the armrest affixed in the door of the automotive vehicle.

The surface 3 of the work 2 is covered with the thermoset coating layer 11 that is made of a high-gloss black-coating material (e.g. piano black, which is a two-liquid type acrylic-urethane coating material for the embodiment of this invention). The thickness H1 (see FIG. 2) of the thermoset coating layer 11 is set at 0.01 mm or more and 0.05 mm or less (e.g. 0.025 mm for the embodiment of this invention). The decorative surface 4 of the design 20 is formed on part of the surface 12 of the thermoset coating layer 11. Also, the region 5, except for the decorative surface 4 on the surface 12, is a non-drawing area in which the design 20 is not drawn.

Figure 3:
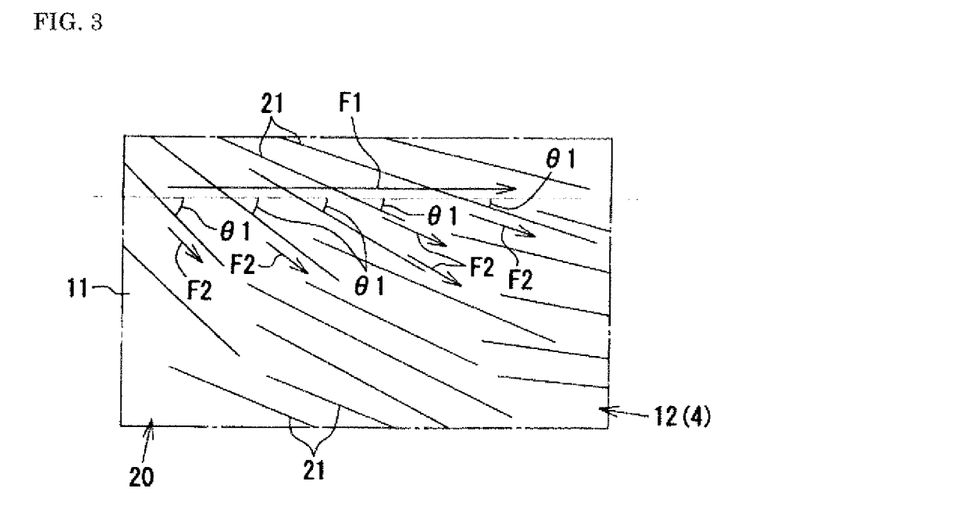
FIG. 3 is an enlarged planer view of the design.

As described in FIG. 3, the design 20 is made such that the laser-processed linear grooves 21 are closely aligned along the specific direction F1. Specifically, the angle θ1 made by the direction F1 and the direction F2, in which the laser-processed grooves 21 are extending, is gradually changing into the direction (i.e. the specific direction F1) in which the laser-processed linear grooves 21 are aligned. More precisely, in the embodiment of this invention, the angle θ1 changes by order of 45 degrees, 35 degrees, 25 degrees, 15 degrees and 5 degrees as going to the right hand of the laser-processed linear grooves 21 in the specific direction F1. Also, FIG. 3 shows, for convenience sake, only the angle θ1 that is specified for five of the laser-processed linear grooves. However, the angle θ1 is actually specified for all of the laser-processed linear grooves 21.

As shown in FIG. 2, the line-width W1 of the laser-processed linear grooves 21 on the surface 12 of the thermoset coating layer 11 is set at 0.03 mm or more and 0.1 mm or less (e.g. 0.08 mm for the embodiment of this invention). The depth H2 of the laser-processed linear grooves 21 of the surface 12 is set at 0.005 mm or more and 0.035 mm or less (e.g. 0.01 mm or more and 0.015 mm or less for the embodiment of this invention), which is less than the thickness H1 (0.025 mm) of the thermoset-coating layer 11. Furthermore, the line-pitch P1 of the laser-processed linear grooves 21 is set at 0.1 mm or more and 1.0 mm or less (e.g. 0.2 mm or the like for the embodiment of this invention).

Figure 4:
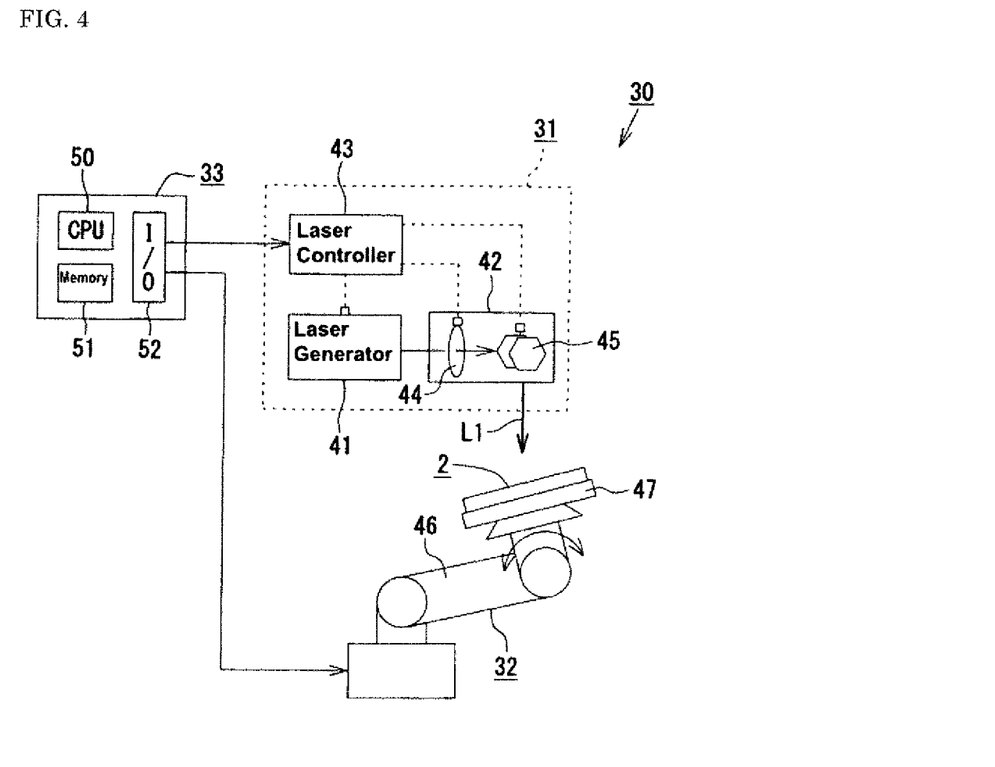
FIG. 4 is a schematic diagram of the surface-decorative scheme.

Next, the surface-decorative scheme 30 for manufacturing the automotive-decorated part 1 is shown.

As shown in FIG. 4, the surface-decorative scheme 30 comprises a laser-irradiation device 31 and a work-displacement robot 32. The laser-irradiation device 31 comprises a laser generator 41 that generates a laser L1 (e.g. a YAG laser of 1,064 nm of wavelength for the embodiment of this invention); a laser deflector 42 that deflects the laser L1; and a laser controller 43 that controls the laser generator 41 and the laser deflector 42. The laser deflector 42 is an optical system made by the combination of the lens 44 and the reflection mirror 45. The irradiation position and the focal position of the laser L1 can be adjusted by changing the position of the lens 44 and the reflection mirror 45. The laser controller 43 controls the irradiation-time modulation, the irradiation-intensity modulation and the irradiation-area modulation of the laser L1.

The work-displacement robot 32 comprises a robot arm 46 and a work-support member 47 attached to the front edge of the robot arm 46. The work-displacement robot 32 has the function of changing the position and the angle of the work 2 by activating the robot arm 46 so that the irradiation position and the irradiation angle of the laser L1, with respect to the surface 3 of the work 2, can be changed.

Next, the electrical configuration of the surface-decorative scheme 30 is described herein.

As shown in FIG. 4, the surface-decorative scheme 30 comprises a controller 33 that controls the whole scheme in an integrated way. The controller 33 is made of a widely known computer comprising a CPU50, a memory 51 and an input/output port 52 or the like. The CPU50 is electrically connected to the laser-irradiation device 31 and to the work-displacement robot 32 and controls them by various activating signals.

The laser-irradiation data for the irradiating laser is stored in the memory 51. The laser-irradiation data is the data obtained by converting the CAD data. The CAD data is data made by converting the image-data showing the thermoset coating layer 11 on which the laser-processed linear grooves 21 are formed. The memory 51 stores the data showing the laser-irradiation parameter (the irradiation position, the focal position, the irradiation angle, the irradiation area, the irradiation intensity, the irradiation frequency, the irradiation pitch or the like) that is used in the laser irradiation.

Next, the method for manufacturing the automotive-decorated part 1 is described herein.

Firstly, prepare the work 2 that is specifically formed three-dimensionally by using a black thermoplastic resin (e.g. an ABS resin for the embodiment of this invention). In the work-forming process, specifically, the work 2 is formed by using a mold (no drawing provided) not having an emboss (i.e. a fine concave and convex) for forming the laser-processed linear grooves 21. The work 2 is manually set onto the work-support member 47 (see FIG. 4) of the work-displacement robot 32 by an operator.

Figure 5:
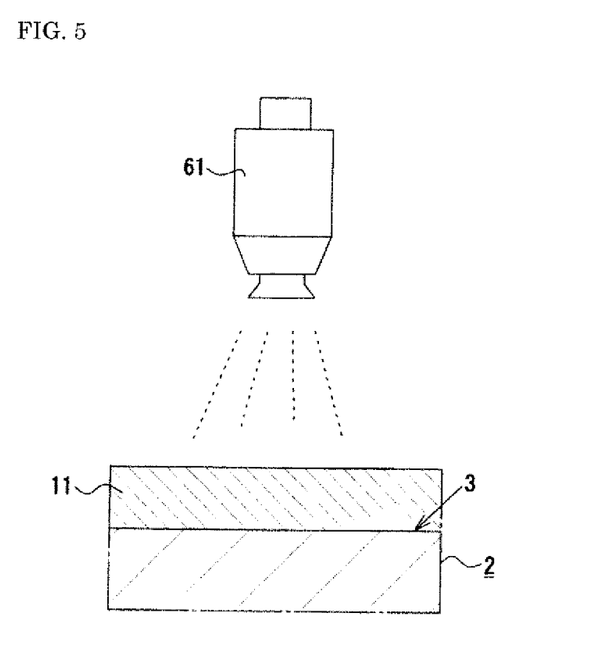
FIG. 5 is an explanatory drawing showing the forming process of the thermoset coating layer.

Next, in the process of forming the thermoset coating layer, the thermoset coating layer 11 for covering the surface 3 of the work 2 is formed (see FIG. 5). Specifically, the CPU50 generates the signal i.e. the activating signal for forming the thermoset coating layer and then transmits that signal to the coating equipment (no drawing provided). Then, the coating equipment activates the coater 61 to conduct coating according to the thermoset coating layer signal generated by the CPU50. More precisely, the two-liquid type acrylic-urethane coating material is sprayed onto the surface 3 of the work 2 by using the coater 61, thus forming the thermoset coating layer 11 by the specific drying process.

The CPU50 retrieves the laser-irradiation data stored in the memory 51. Then, the robot-activating signal is produced according to the laser-irradiation data that is being retrieved, thus generating the robot-activating signal to the work-displacement robot 32. The work-displacement robot 32 activates the robot arm 46 according to the robot-activating signal being generated by the CPU50, thus transferring the work 2 being supported by the work-support member 47 to the place where the laser L1 can be irradiated onto the decorative surface 4 provided on the surface 12 of the thermoset coating layer 11. At the same time, the angle of the work 2 being supported by the work-support member 47 is adjusted, thus adjusting the irradiation-angle of the laser L1 with respect to the decorative surface 4.

Figure 6:
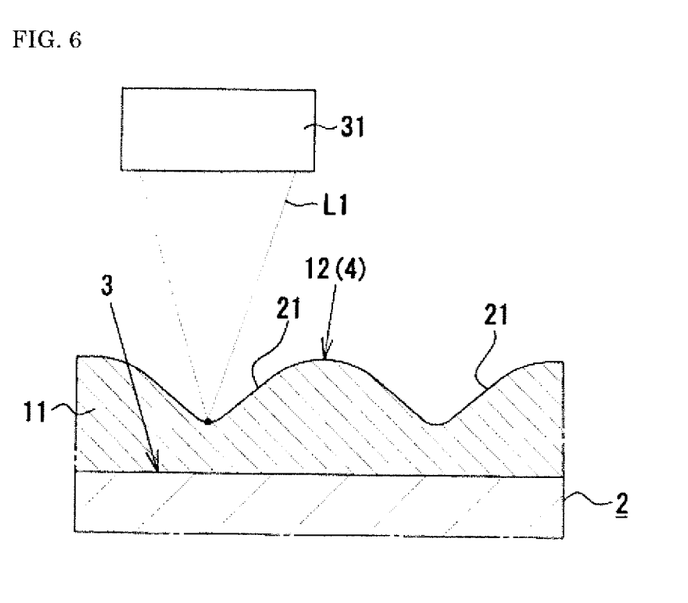
FIG. 6 is an explanatory drawing showing the laser-irradiating process.

Then, in the laser-irradiation process, the laser L1 is irradiated onto the decorative surface 4 that is set on the surface 12 of the thermoset coating layer 11. More precisely, at first, the CPU50 retrieves the laser-irradiation data stored in the memory 51 and then produces, based on such laser-irradiation data being retrieved, the laser-processed linear-groove forming signal that is the activating signal for forming the laser-processed linear grooves. Then, the CPU50 generates the laser-processed linear-groove forming signal to the laser-irradiation device 31. The laser-irradiation device 31 then irradiates, according to the laser-processed linear-groove forming signal generated by the CPU50, the laser L1 onto the specific irradiation area configuring the decorative surface 4 (see FIG. 6). Also, the laser controller 43 allows the laser generator 41 to irradiate the laser L1 and to control the laser deflector 42 according to the pattern of the laser-processed linear grooves 21. Such control makes it possible to determine the irradiation position of the laser L1 and to determine the focal position of the laser L1 to be set onto the surface layer of the thermoset coating layer 11. In which case, the heat of the laser L1 is concentrated onto the surface layer, which increases the amount of heat and sublimates the surface layer of the thermoset coating layer 11, thus forming the design 20 with the laser-processed linear grooves 21 closely aligned in the specific direction F1 on the surface 12 (decorative surface 4) of the thermoset coating layer 11. At which time, the automotive-decorated part 1 is completed.

Therefore, the embodiment of this invention achieves the following effects.

(1) In the laser-irradiation process of the method for manufacturing the automotive-decorated part 1 as the embodiment of this invention, the design 20 is formed such that the angle θ1 made by the direction (the specific direction F1) in which the laser-processed linear grooves 21 are aligned and by the direction F2 in which these linear grooves 21 are extending is gradually changed into the direction in which these linear grooves 21 are aligned. Therefore, as the direction of one's eye changes, the eye catches the light that is being reflected by the different laser-processed linear grooves 21. Thus, the design 20 becomes an active one having a dynamic visual effect (specifically, a sparkling effect) that achieves a more excellent design than one having a static visual effect (e.g. a three-dimensional effect or a feeling-of-depth effect).

(2) The embodiment of this invention eliminates the need for the conventionally known process of attaching the decorative film onto the surface of the work, reducing the material cost of such decorative film, and eliminates the need for plate-making or the like that is used in printing a design onto the decorative film, thus reducing escalating manufacturing cost. In the case that the work has a squeezed shape, it is difficult to adopt the conventional process to form the design by attaching the decorative film onto the surface of such a work. However, the embodiment of this invention, of that of irradiating the laser L1, can fully achieve the design 20 regardless of the shape of the work 2.

(3) The thermoset coating layer 11 configuring the automotive-decorated part 1 as the embodiment of this invention is made of a black two-liquid type acrylic-urethane coating material, i.e. a dark colored coating material that readily absorbs heat. Compared to the case of which the thermoset coating layer 11 is covered with a light colored coating material, the energy of the laser L1 is easily absorbed into the heated surface layer of the thermoset coating layer 11, thus forming the laser-processed linear grooves 21 in a short time. Therefore, the efficiency of manufacturing the automotive decorated part 1 is improved.

(4) The embodiment of this invention allows for the laser-processed linear grooves 21 to be formed by irradiating the laser L1 onto the thermoset coating layer 11, which makes it possible to form the fine laser-processed linear grooves 21 more properly than in the case of forming the laser-processed linear grooves 21 by injection-metal molding.

Second Embodiment

Hereinafter, the second embodiment of this invention is described in reference to the drawings. Different points than those of the above first embodiment are mainly described herein. The design configuration of the second embodiment is different than that of the first embodiment.

Figure 7:
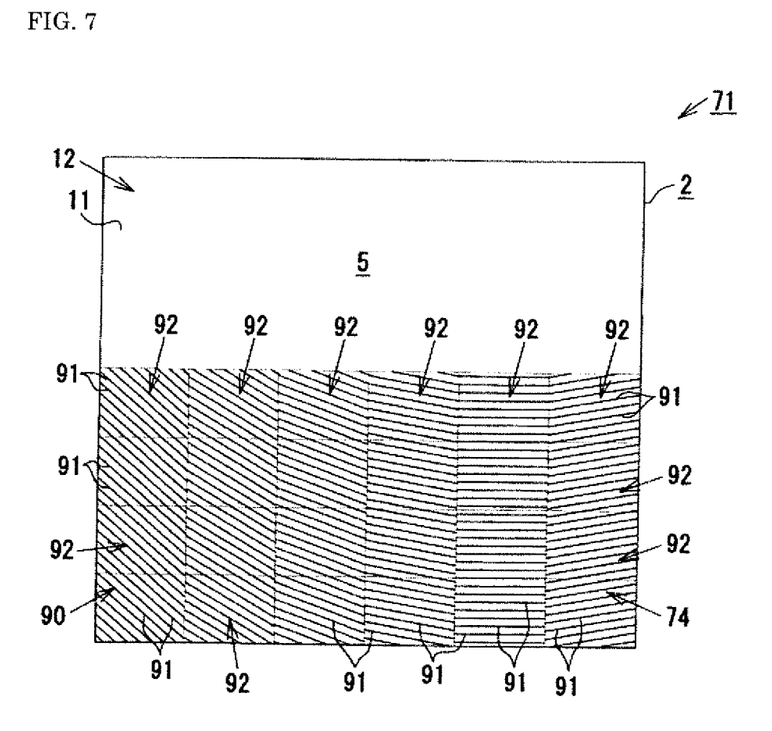
FIG. 7 is a schematic-planer view of a part of the automotive-decorated part as the second embodiment.
Figure 8:
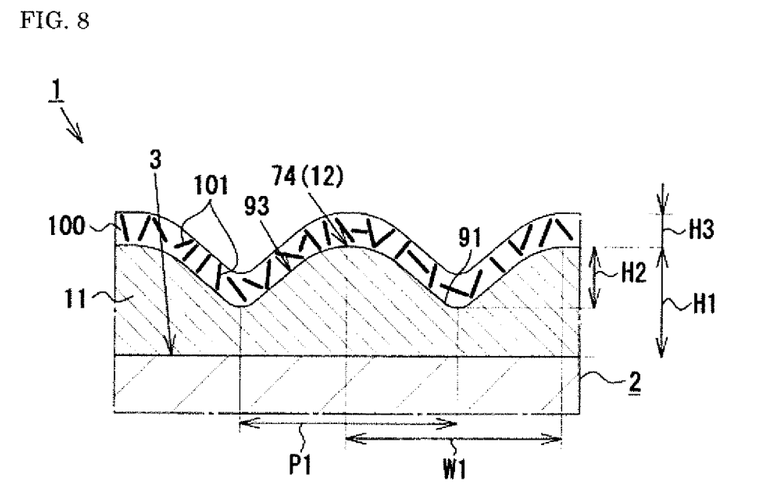
FIG. 8 is a cross-sectional view of the main section of the work and of the thermoset-coating layer and of the brilliant-material-containing coating layer.

As shown in FIGS. 7 and 8, specifically, of the automotive-decorated part 71 as the embodiment of this invention, a decorative surface 74, on which a design 90 that is different than that of design 20 of the above first embodiment, is formed on a part of the surface 12 of the thermoset coating layer 11. The design 90 of the second embodiment is one of which a plurality of a block 92 is arranged in a matrix in a plane in the planar direction of the decorative surface 74. Each block 92 is identical in shape (a rectangular-shaped block in planer view) and has the same area. Therefore, there is no clearance between each block 92 lying side by side.

Figure 9:
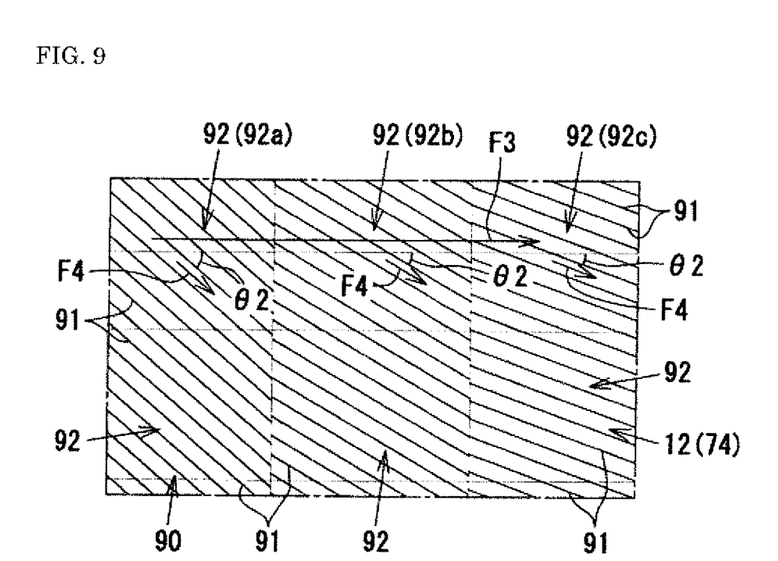
FIG. 9 is an enlarged planer view of a block configuring a design.

Each block 92 is configured by the forming of the laser-processed linear grooves 91 in parallel with an even pitch. Specifically, the line pitch P1 of the laser-processed linear grooves 91 on the whole blocks 92 is set at 0.1 mm or more and 1.0 mm or less (i.e. 0.2 mm for the embodiment of this invention). Also, as shown in FIG. 9, the angle θ2, made by the specific direction F3 in which the laser-processed linear grooves 91 are aligned and the direction F4 in which the laser-processed linear grooves 91 configuring the block 92a are extending, is set at 40 degrees. In the same way, the angle θ2 made by the specific direction F3 and the direction F4 in which the laser-processed linear grooves 91 configuring the block 92b are extending, is set at 30 degrees, and the angle θ2, made by the specific direction F3 and the direction F4 in which the laser-processed linear grooves 91 configuring the block 92c are extending, is set at 20 degrees. Therefore, the angle θ2 of the other block 92b (or 92c) adjoining the right side of the specific block 92a (or 92b) changes by 15 degrees, each, or less (10 degrees for the embodiment of this invention) from the angle θ2 of the specific block 92a (or 92b). Also, FIG. 9 shows, for convenience sake, only the angle θ2 as defined by the laser-processed linear grooves 91 configuring the three blocks 92

(i.e. the block 92a, the block 92b and the block 92c). However, the angle θ2 is actually defined by the laser-processed linear grooves 91 configuring the whole block 92.

As shown in FIG. 8, the whole surface 12 of the thermoset coating layer 11, including the decorative surface 74 and the region 5 (FIG. 7) except for the decorative surface 74, is covered with a brilliant agent-containing coating layer 100. This brilliant agent-containing coating layer 100 for the embodiment of this invention is a coating layer made of a metallic-coating material containing metallic flakes i.e. aluminum flakes as the brilliant agent 101. Also, the brilliant agent 101 is scale shaped, and its average particle size is set at 0.005 mm or more and 0.03 mm or less (0.015 mm for the embodiment of this invention). Also, the thickness H3 of the brilliant agent-containing coating layer 100 is set at 0.005 mm or more and 0.025 mm or less (0.005 mm for the embodiment of this invention). In other words, the thickness H3 of the brilliant-agent-containing coating layer 100 is less than the depth H2 (e.g. 0.01 mm or more and 0.015 mm or the less) of the laser-processed linear grooves 91.

Next, a method for manufacturing the automotive decorated part 71 is described herein.

In the laser-irradiation process for the embodiment of this invention, each of the laser-processed linear grooves 91 configuring the specific block 92a (or 92b) is formed, in order, by laser irradiation. Then, another laser-processed groove 91 adjoining another block 92a (92b) is formed by the same series of operations as above. Each time, the operation is shifting from the first step (or the second step) to form the specific block 92a (or 92b) to the second step (or the third step) to form a different block 92b (or 92c). The angle θ2 of the different block 92b (or 92c) is lessened by 10 degrees, each, from the angle θ2 of the specific block 92a (or 92b).

Firstly, the CPU50 retrieves the laser-irradiation data from the memory 51 and produces according to that laser-irradiation data an activating signal for forming the laser-processed linear grooves on the block 92a, i.e. the first laser-processed linear-groove-forming signal. Then, such CPU50 transmits that first laser-processed linear-groove-forming signal to the laser-irradiation device 31. Then, the laser-irradiation device 31, according to the first laser-processed linear-groove-forming signal generated by the CPU50, irradiates the laser L1 onto the block 92a. Thus, the block 92a of which the laser-processed linear grooves 91 are aligned in parallel is formed on the surface 12 of the thermoset coating layer 11.

Secondly, the CPU50, according to the laser-irradiation data being retrieved from the memory 51, produces the activating signal for forming the laser-processed linear grooves on the block 92b, i.e. the second laser-processed linear-groove-forming signal. Then, the CPU50 generates that second laser-processed linear-groove-forming signal to the laser-irradiation device 31. The laser irradiation device 31, according to the second laser-processed linear-groove-forming signal, irradiates the laser L1 onto the block 92b. Thus, the block 92b, of which the laser-processed linear grooves 91 are aligned in parallel, is formed on the surface 12 of the thermoset coating layer 11.

Each time that the laser-processed linear grooves 91 are completely formed on the specific block 92, the CPU50 repeats the control process to form the laser-processed linear grooves 21 on a different block 92 adjoining the specific block 92. After that, the laser-processed linear grooves 21 are completely formed on the whole block 92. Then, the design 90, as shown in FIG. 7, is drawn on the surface 12 of the thermoset coating layer 11.

Figure 10:
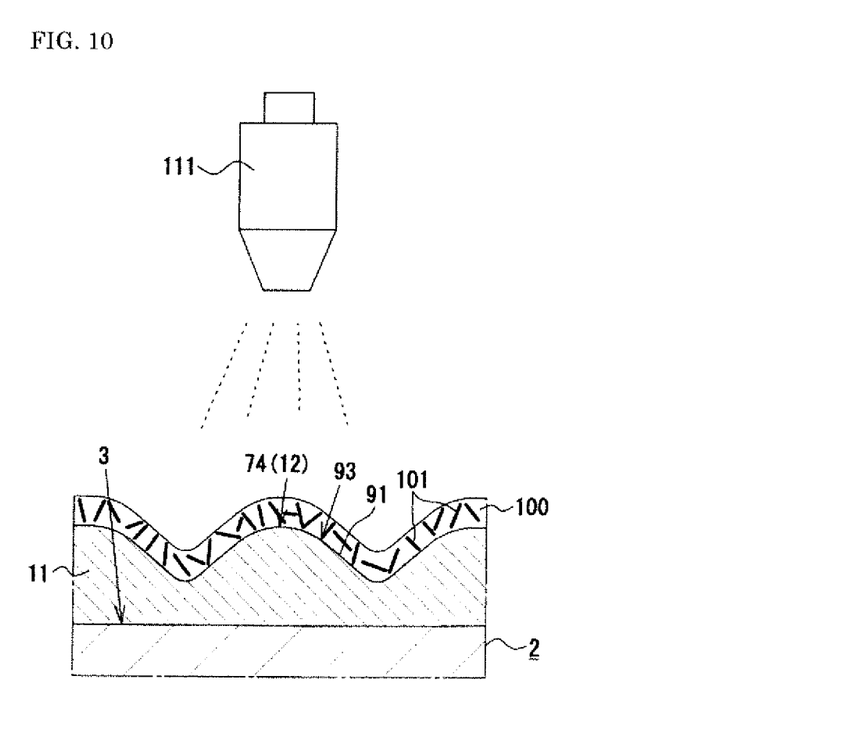
FIG. 10 is an explanatory drawing showing the process of forming the brilliant material contained within the coating layer.

After the laser-irradiating process, the process of forming the brilliant-agent-containing coating layer is done, thus forming the brilliant-agent containing coating layer 100 that covers the surface 12 (i.e. the decorative surface 74 and the region 5 except for the decorative surface 74) of the thermoset coating layer 11 (see FIG. 10). Specifically, the CPU50 produces the brilliant-agent-containing coating layer-forming signal that is the activating signal for forming the brilliant-agent-containing coating layer and then generates that signal for forming the brilliant-agent-containing coating layer onto the coating equipment. Then, the coating equipment begins the coating operation by the spray gun 111 of the coater according to the signal. Precisely, a metallic-coating operation is done on the surface 12 of the thermoset coating layer 11 and on the surface 93 of the laser-processed linear groove 91 by using the spray gun 111. As such, the brilliant-agent-containing coating layer 100 is formed. Thus, the automotive-decorated part 71 is completely manufactured.

Therefore, the embodiments of this invention achieve the following effects.

(5) The method for manufacturing the automotive-decorated part 71 as the embodiment of this invention makes it possible to change the angle θ2 that is made by the direction (i.e. the specific direction F3) in which the laser-processed linear grooves 91 are aligned and the direction F4 in which the laser-processed linear grooves 91 are extending and changing by 10 degrees each time that the operation is shifting from the specific block 92a (or 92b) to a different adjoining block 92b (or 92c). As a result, the block 92, reflecting the light according to the direction of the eye, changes. Thus, such a design 90 is made seemingly to be an active one such that a dynamic visual effect is achieved. Also, the image data of the simply formed block 92, of which the laser-processed linear grooves 91 are aligned in parallel, is united to form the laser-irradiation data for the irradiating laser, thus making it easier in producing such laser-irradiation data.

(6) Of the embodiment of this invention, the brilliant agent 101 within the coating layer 100 makes it possible beautifully to change the degree of light being reflected from sections (of the decorative surface 74) in which the laser-processed linear grooves 91 exist or from sections (region 5 except for the decorative surface 74) in which the laser-processed linear grooves 91 do not exist. Thus, such a coating layer 100 makes it possible to express the change in color and the depth of feeling of the design, thus improving the excellence of the design. Besides, in forming such a coating layer 100 with such a brilliant agent, such coating layer 100 protects the decorative surface 74 and the surface 93 of the laser-processed linear grooves 91 and the region 5 except for the decorative surface 74, thus improving the anti-scratch effect of the work.

The above embodiment of this invention can be modified as follows.

As described in the above embodiments, the automotive-decorated part 1, 71 is embodied as the armrest of a vehicle door. However, it is possible that such an automotive-decorated part be embodied as another interior part such as a console box, an instrument panel or the like or as an exterior part such as a radiator grill or a rocker molding or the like.

Figure 11:
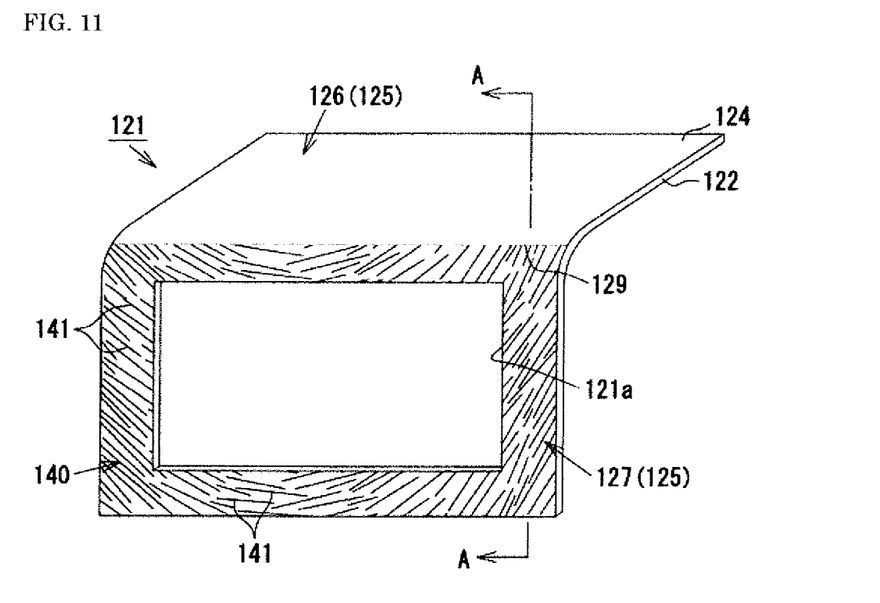
FIG. 11 is an oblique perspective view of the automotive-decorated parts of the other embodiment.
Figure 12:
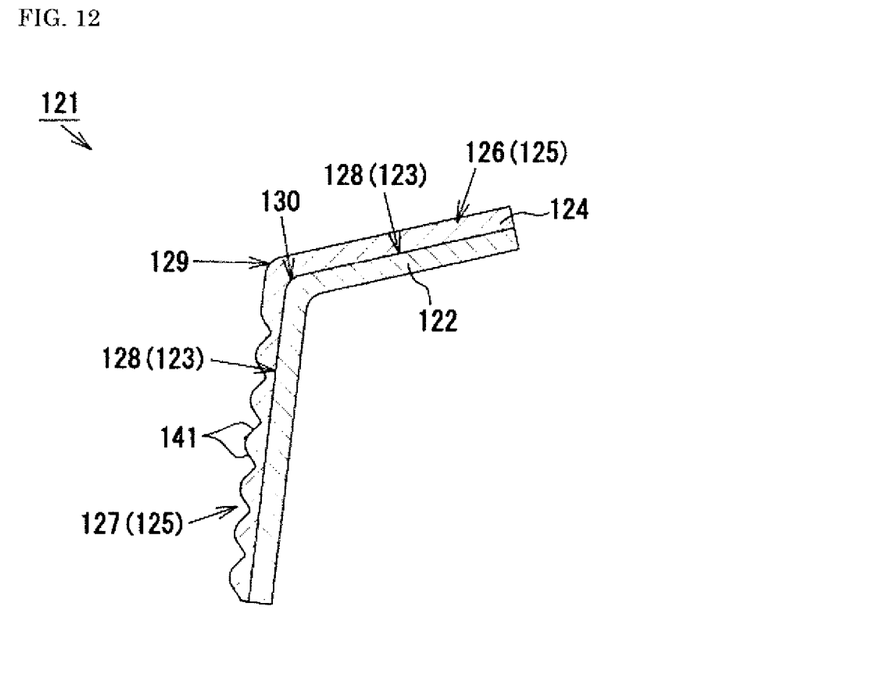
FIG. 12 is the A-A line cross-sectional view of FIG. 11.

Also, the automotive-decorated part can be embodied as a center-cluster. For example, as shown in FIGS. 11 and 12, the automotive-decorated part 121 comprises a three-dimensional work 122 and a thermoset coating layer 124 that covers the surface 123 of the work 122. The automotive-decorated part 121 of the embodiment of this invention is a center-cluster with an opening 121*a* onto which a monitor of the navigation system is to be mounted. Also, the surface 125 of the thermoset coating layer 124 comprises a non-decorative surface 126 (upper surface) that is to be upwardly set in the vehicle and comprises a decorative surface 127 (front surface) that is bent nearly at a right angle to the non-decorative surface 126 in front of the driver's seat. The non-decorative surface 126 and the decorative surface 127 are continuously formed on the surface 125 of the thermoset coating layer 124. The design 140, which is the same as that of the design 20 of the above first embodiment, is drawn on the decorative surface 127. The design 140 is formed such that the laser-processed linear grooves 141 are closely aligned. Also, the surface 123 of the work 122 is made of the plural members 128. An outer periphery 129 of the decorative surface 127 is located on the character line 130 that is the joint of each member 128.

As such, the level of gloss on the outer periphery 129 of the decorative surface 127, which is the character line of the automotive-decorated part 121 changes, which makes it possible to express a three-dimensional feeling. Also, it is possible to change the design 140 to the same as that of the design 90 for the above second embodiment of this invention. In which case, it is also possible to form the brilliant-agent-containing coating layer so that it covers the decorative surface 127 (and the non-decorative surface 126).

- Of the second embodiment, the design 90 having a combination of the plural block 92, is drawn on the decorative surface 74. Of the first embodiment, the design 20, having a block 92, is drawn on the decorative surface 4. However, it is possible to draw the design with the block (i.e. the same design as the design 90 for the second embodiment of this invention) on the decorative surface 4 for the first embodiment of this invention. It is still possible to draw the design without the block (i.e. the same design as that of the design 20 for the first embodiment of this invention) on the decorative surface 74 for the second embodiment of this invention.
- Of each embodiment, above, of this invention, the laser-processed linear grooves 21, 91 are formed on the surface 12 of the thermoset coating layer 11. However, it is possible to form such grooves 21, 91 on the surface of a coated layer that is formed by evaporation coating and not on the surface of a coating layer that is formed by such a coating. Furthermore, it is possible to form such grooves 21, 91 directly onto the surface 3 of the work 2 without the thermoset coating layer 11 to cover the surface 3 of the work 2.
- Of the above second embodiment, it is possible to conduct, after the brilliant-agent-containing coating layer-forming process, a clear-coat-layer forming process for forming the clear-coat layer to protect the brilliant-agent-containing coating layer 100. Contrarily, it is also possible to omit the brilliant-agent-containing coating layer-forming process for the second embodiment of this invention.
- The above surface-decorative scheme 30 for each embodiment is for manufacturing the automotive-decorated part 1, 71. Yet, it is not limited to that but is for manufacturing decorated parts such as electrical appliances or furniture or the like.

Besides the technical ideas of this invention, as described above, other technical ideas to be understood are described hereinafter.

(1) A method for manufacturing a decorated part according to the first aspect of this invention, characterized in including a process for forming the thermoset coating layer consisting of a coating material with a thermosetting property to form a thermoset coating layer that covers the surface of the work before the laser-irradiation process and includes a work-forming process to form the work by using a mold having no emboss for forming the laser-processed linear grooves before the thermoset coating layer-forming process.

(2) A decorated part according to the second aspect of this invention, characterized in that the design is a combination of the plural blocks of which the laser-processed linear grooves are aligned in parallel with each other, whereby the difference between the angle of the laser-processed linear grooves configuring the specific block and the angle of the laser-processed linear grooves configuring a different block is 15 degrees or less.

(3) A decorated part according to the second aspect of this invention, characterized in that the line-pitch of the laser-processed linear grooves is 0.1 mm or more and 1.0 mm or less.

(4) A decorated part according to the second aspect of this invention, characterized in that the surface of the work is covered with the thermoset coating layer consisting of a coating material having the thermosetting property, whereby the laser-processed linear grooves are formed on the surface of the thermoset coating layer that is the decorative surface.

(5) A decorated part according to the second aspect of this invention, characterized in that the decorative surface is covered with the brilliant-agent-containing coating layer consisting of a coating material with the scale-shaped brilliant agent.

(6) A decorated part according to the second aspect of this invention, characterized in that the surface of the work is made of the many members, whereby the outer periphery of the decorative surface is located on the character line consisting of the plural joint members.

DESCRIPTION OF THE REFERENCE SIGNS

1, 71, 121: Automotive decorated parts as the decorated part
2, 122: Work
3, 123: Surface of the work
4, 74, 127: Decorative surface
11, 124: Thermoset coating layer
12, 125: Surface of the thermoset coating layer
20, 90, 140: Design
21, 91, 141: Laser-processed linear groove
92: Block
92*a*, 92*b*: Specific block
92*b*, 92*c*: Another block
100: Brilliant-agent containing coating layer
101: Brilliant agent
128: Plurality of surfaces configuring the surface of the work
129: Outer periphery of the decorative surface
130: Character line
F1, F3: Specific direction
F2, F4: The direction in which the laser-processed linear grooves are extending
L1: Laser
P1: Line pitch
$\theta 1$, $\theta 2$: Angle made by the specific direction and by the direction in which the laser-processed linear grooves are extending

The invention claimed is:

1. A decorated part comprising:

a three-dimensional resin-molding work, the three-dimensional resin-molding work having a surface; and a thermoset coating-film consisting of a gloss black-coating material with a thermosetting property, the thermoset coating-film formed on the surface of the three-dimensional resin-molding work, the thermoset coating-film having multiple laser-processed grooves formed therein, the thermoset coating-film with the multiple laser-processed grooves forming a design-containing decorative surface, the multiple laser-processed linear grooves aligned in a specific direction as part of the decorative surface, the design of the design-containing decorative surface formed such that an angle that is made by the specific direction and by a direction in which the multiple laser-processed linear grooves extend changes into a direction in which such multiple laser-processed linear grooves are aligned, wherein for the multiple laser-processed grooves, a number of the multiple laser-processed grooves are not parallel to each other in the specific direction and the direction that changes, wherein each of the multiple laser-processed grooves have opposing ends, and ends of each of the multiple laser-processed grooves are separate from adjacent multiple laser-processed grooves, and wherein for the multiple laser-processed grooves, a number of the multiple laser-processed grooves have different lengths along the specific direction and the direction that changes, and a brilliant agent-containing coating layer covering the thermoset coating-film having the multiple laser-processed grooves formed therein, wherein a thickness of the brilliant-agent-containing coating layer is less than a depth of the multiple laser-processed grooves and that a surface of the brilliant-agent-containing coating layer has a shape that follows an inner surface of the multiple laser-processed grooves.

2. A decorated part according to claim 1, characterized in that the design is a combination of plural blocks.

* * * * *